United States Patent [19]

Wilhoit

[11] Patent Number: 5,573,800
[45] Date of Patent: Nov. 12, 1996

[54] ANTIMICROBIAL COMPOSITION FOR SURFACE TREATMENT OF FOODSTUFFS

[75] Inventor: Darrel L. Wilhoit, Joliet, Ill.

[73] Assignee: Viskase Corporation, Chicago, Ill.

[21] Appl. No.: 51,259

[22] Filed: Apr. 23, 1993

Related U.S. Application Data

[63] Continuation of Ser. No. 804,156, Dec. 6, 1991, abandoned, and a continuation-in-part of Ser. No. 472,731, Feb. 5, 1990, abandoned, which is a continuation-in-part of Ser. No. 312,840, Feb. 21, 1989, abandoned.

[51] Int. Cl.$^6$ ............................................. A23L 3/3463
[52] U.S. Cl. .......................... 426/326; 426/61; 426/133; 426/271; 426/310; 426/321; 426/323; 426/324; 426/335; 426/415; 426/532
[58] Field of Search .......................... 426/61, 310, 321, 426/323, 324, 325, 326, 335, 532, 32, 42, 133, 271, 415

[56] References Cited

U.S. PATENT DOCUMENTS

| | | | |
|---|---|---|---|
| 2,858,225 | 10/1958 | Gooding | 99/171 |
| 3,124,468 | 3/1964 | Williams | 99/174 |
| 4,597,972 | 7/1986 | Taylor | 426/36 |
| 4,883,673 | 11/1989 | Gonzalez | 426/61 |
| 5,217,950 | 6/1993 | Blackburn | 514/2 |

FOREIGN PATENT DOCUMENTS 12399  12/1989  WIPO ........................... A23C 19/11

OTHER PUBLICATIONS

Bunia, A. K. 1988, "Purification, characterization and antimicrobial spectrum of abacteriocin produced by Pediococcus acidilactici", Journal of Applied Bacteriology, vol. 65(4) pp. 261–268.

*Primary Examiner*—Helen Pratt
*Attorney, Agent, or Firm*—Cedric M. Richeson; Roger Aceto

[57] ABSTRACT

An antimicrobial composition comprising a Pediococcus-derived bacteriocin or synthetic equivalent antibacterial agent in combination with a chelating agent. Such composition may be used in conjunction with a foodstuff or with a food packaging film (with or without the chelating agent) to protect foodstuffs against growth of harmful bacteria such as Listeria. Also disclosed are methods of protecting foodstuffs using film having a transferrable antimicrobial agent which may protect foodstuff surfaces before and/or following removal of the film and peelable films useful in such methods which may include the above bacteriocin.

16 Claims, No Drawings

ANTIMICROBIAL COMPOSITION FOR SURFACE TREATMENT OF FOODSTUFFS

This application is a continuation of prior U.S. application Ser. No. 07/804,156 filing date Dec. 6, 1991, now abandoned, and is a continuation-in-part of application Ser. No. 07/472,731 filing date Feb. 5, 1990, now abandoned, which is a continuation-in-part of application Ser. No. 07/312,840 filing date Feb. 21, 1989, now abandoned.

BACKGROUND OF THE INVENTION

The invention relates to antimicrobial and bactericidal compositions, and packaging and processing films for foodstuffs containing such compositions and a method for inhibiting or preventing growth of microbes such as bacteria, molds, and yeasts on food surfaces.

"Food preservation", as that term is used herein, includes methods which guard against food poisoning as well as methods which delay or prevent food spoilage due to microbes. Food preservation keeps food safe for consumption and inhibits or prevents nutrient deterioration or organoleptic changes causing food to become less palatable.

"Food spoilage", as that term is used herein, includes any alteration in the condition of food which makes it less palatable including changes in taste, smell, texture or appearance. Spoiled food may or may not be toxic.

"Food poisoning", as that term is used herein, refers to mammalian disease caused by ingestion of food contaminated by pathogenic viruses, molds or bacteria and/or their toxins. Pathogen-contaminated food does not necessarily show any organoleptic sign of spoilage. Bacterial food poisoning may be caused by either infection of the host by the bacterial organism or by action of a toxin produced by the bacteria either in the food or in the host.

Prevention of food spoilage and food poisoning has been attempted throughout history often through trial and error. The early attempts have resulted in the adoption of such food preservation methods as the drying, salting and/or smoking of foods in order to preserve them. It has been relatively recent in recorded history that food preservation has been placed upon a scientific foundation. In the nineteenth century, work of such scientists as Louis, Pasteur and Robert Koch elucidated the bacterial causes of food poisoning and spoilage and provided new methods of identifying pathogenic bacteria and of preserving food.

Present food technologists utilize an array of physical, chemical, and biological processes and agents to preserve food and prevent the transmission of disease via foodstuffs. In addition to such processes as irradiation, fermentation, pasturization, control of temperature, pH and/or water activity, a plethora of chemical agents exist. These agents include antioxidants to prevent chemical degradation of food, as well as compositions which kill or inhibit deleterious bacteria and/or other microbes thereby preserving food i.e. preventing both spoilage and the transmission of disease. Commonly employed antimicrobial chemical agents include nitrites, nitrates, sulphur dioxide, sulfites, and acids such as acetic, propionic, lactic, benzoic, and sorbic acid and their salts, wood smoke and liquid smoke, and antibiotics such as natamycin and nisin.

Prevention of food poisoning is of paramount importance in the food processing industry. Concern for food safety has led most countries to heavily regulate the food industry to ensure public health. Also, manufacturers of processed food invest considerable resources to ensure the safety of their products. Despite these efforts, food poisoning still occurs. Many instances of food poisoning are attributed to bacteria such as Salmonella, Clostridium, and Staphylococcus among others.

Of rising concern is the relatively recent discovery in the food processing industry of widespread Listeria contamination of poultry and processed foods such as wieners, other sausages, cheese, dairy products including novelty ice cream, and seafood. Of particular concern is the recent evidence that pasteurized and fully cooked processed foods are being contaminated with microbes such as Listeria monocytogenes following cooking or pasteurization and prior to packaging for point of sale. Such contamination is typically surface contamination believed to be caused by contact of microbes with food surfaces subsequent to heat treatment (i.e. cooking or pasteurization). Microbes such as Listeria may be airborne (i.e. carried by dust) or present on food contact surfaces such as processing equipment.

In the 1980's several outbreaks of food poisoning have been reported worldwide in which the causative agent is suspected to be or has been identified as Listeria contaminated food. Outbreaks of listeriosis (infection by Listeria bacteria) in humans have been reported in Massachusetts, California, and Pennsylvania in the U.S.A. and also in Canada, and Switzerland. These outbreaks have been attributed to ingestion of Listeria contaminated food such as coleslaw, cheese made from raw milk, surface ripened soft cheeses, and salami. Hundreds of people have been affected with a mortality rate of up to about one third of those affected. Particularly susceptible to the disease (which is contagious) are pregnant women, fetuses, newborn and infant children as well as adults with compromised immune systems e.g. adults under treatment with immunosuppressive drugs such as corticosteroids. Listeriosis is a serious disease which may cause meningitis, spontaneous abortion, and perinatal septicemia. Although treatable with early diagnosis, untreated listeriosis exhibits a high mortality rate.

Food preservation by inhibition of growth of Listeria monocytogenes is difficult. Listeria can reportedly reproduce and grow both aerobically and anaerobically, at pHs above 4.85 and over a wide range of temperatures which can be as low as 3° C. and as high as about 45° C. This means that Listeria can grow at normal refrigeration temperatures. Listeria has also been reported as being able to grow in a water solution of up to 10% salt. Fortunately, cooking or pasteurization kills Listeria. Unfortunately, microorganism contamination may occur following pasteurization by the processor. Many people eat processed foods after a significant period of time has elapsed from a first cooking or pasteurization by the food manufacturer thereby permitting bacteria introduced by post-pasteurization contamination to grow. Since this food consumption may occur without reheating the processed food to sufficient temperatures for sufficient time to kill any microbes (such as Listeria) which may have been introduced subsequent to initial cooking, there is a risk of food poisoning. The present invention seeks to ameliorate the aforementioned risk.

SUMMARY OF THE INVENTION

It is an object of the invention to provide a novel bactericidal composition comprising in combination a Streptococcus lactis-derived or synthetic equivalent bacteriocin such as nisin, and a chelating or sequestering agent.

It is an object of the invention is to provide a film containing a heat-resistant antimicrobial agent comprising a Streptococcus lactis-derived or synthetic equivalent bacteriocin such as nisin and a chelating or sequestering agent.

Another object of the invention is to provide a film containing an antibacterial composition effective to kill and/or inhibit growth of Listeria.

It is an object of the invention to provide a polymeric film capable of transferring a controlled amount of an antimicrobial agent to a foodstuff surface.

Another object of the invention is to kill, inhibit or prevent the growth of pathogenic microorganisms on the surface of a foodstuff by a method of transferring an antimicrobial agent to a surface of a foodstuff in a controlled amount.

Another object of the invention is to transfer an antimicrobial agent to a foodstuff in an amount effective to prevent growth of pathogenic bacteria on the surface of the foodstuff after removal of the film for the normal shelf life of the foodstuff.

Another object of the invention is to prevent or inhibit growth of Listeria monocytogenes on skinless wieners following initial cooking and casing removal, through packaging for consumer sale until opening of the packaged wieners for consumption by the consumer.

Another object of the invention is to increase shelf life of processed foods by application of a synergistic mixture, preferably a liquid or a suspension, of a Streptococcus lactis-derived (or synthetic equivalent) bacteriocin and a chelating agent.

The foregoing objects and others which will become apparent from that which follows may be achieved by treating a foodstuff, preferably a foodstuff surface, with an antimicrobial agent, preferably a chelating agent such as citric acid, in combination either with a Streptococcus-derived bacteriocin such as nisin or a Pedicoccus-derived bacteriocin such as pediocin. Treatment may be by any suitable means such as spraying, dipping, mixing or by contacting the foodstuff with a film containing an antimicrobial agent. The film may hold the agent in contact with the foodstuff surface thereby transferring a controlled amount of the agent from the film to the surface of the foodstuff or it may transfer the antimicrobial agent (with or without use of a transfer agent such as zein) to the foodstuff whereby the film may be removed with transferred antimicrobial agent remaining on the foodstuff surface in an effective amount to kill, prevent or inhibit growth of either food spoilage organisms or pathogenic microorganisms such as Listeria thereon.

In one aspect of the invention a food packaging film is provided which comprises a polymeric film containing a heat-resistant, Streptococcus-derived or Pediococcus-derived bacteriocin (or synthetic equivalent) antibacterial agent. This agent is preferably effective against growth of gram positive bacteria, especially Listeria monocytogenes, and may be a heat resistant antibiotic or bacteriocin such as nisin or bacteriocin PA-1. Preferably, the heat resistant agent is nisin. The term "synthetic equivalent" as used herein in reference to bacteriocins means a substance which is chemically synthesized or which is produced by genetically engineered bacteria e.g. using recombinant DNA techniques.

It is not necessary that each and every one of the above objects be present in all embodiments of the invention; it is sufficient that the invention may be advantageously employed.

Fundamental to the composition of the invention is the synergistic combination of a sequestering or chelating agent such as an EDTA salt or citric acid with a Streptococcus-derived or Pediococcus-derived bacteriocin (or synthetic equivalent) such as nisin or pediocin PA-1. A liquid mixture or suspension of nisin and chelating agent is especially preferred.

A fundamental aspect of one method of the present invention is the protection of the foodstuff surface for a substantial period of time after removal of the film.

A fundamental aspect of one embodiment of the inventive film is the use of a heat resistant antimicrobial agent which is effective against bacteria after pasteurization or heat treatment.

DETAILED DESCRIPTION OF THE INVENTION

A novel antimicrobial composition comprising a synergistic combination of a Streptococcus-derived bacteriocin such as nisin or a Pediococcus-derived bacteriocin such as pediocin, (or a synthetic equivalent) and a chelating agent such as citric acid has been discovered to have unexpectedly good bactericidal properties especially against pathogenic bacteria such as Listeria monocytogenes. Additionally, the inventive composition surprisingly is able to prolong food shelf life by preventing food spoilage for a longer period of time than would be expected based upon the effectiveness of either component alone.

Nisin is the preferred bacteriocin. Nisin is a polypeptide bacteriocin produced by the lactic acid bacteria, Streptococcus lactis Group N.

Nisin is reportedly a collective name representing several closely related substances which have been designated A, B, C, D and E nisins having a similar amino acid composition. The structure and properties of nisin are further discussed in the article by E. Lipinska, entitled "Nisin and Its Applications", *The 25th Proceedings of the Easter School in Agriculture Science at the University of Nottingham,* 1976, pp. 103–130 (1977), which article is hereby incorporated by reference. The World Health Organization Committee on Biological Standardization has established an international reference preparation of nisin, and the international unit (IU hereinafter) is defined as 0.001 mg of this preparation. NISAPLIN is the brand name for a Nisin concentrate containing 1 million IU per gram which is commercially available from Aplin & Barrett Ltd., Trowbridge, Wiltshire, England.

Nisin is a known food preservative which is also known to be heat-stable, acid-stable and active against gram-positive bacteria. Nisin is used as a food preservative in dairy products and vegetables usually in conjunction with heat treatment. Nisin also occurs naturally in raw milk and has been used in heat processing of meat pastes. Nisin is considered to be nontoxic with toxicological data indicating no adverse effect at levels of 3.3 million IU per Kg of body weight. Nisin reportedly can stand heating to 121° C. without loss of activity. Although some loss of activity may be expected when used with processed foods, this may be ameliorated e.g. by increasing the amount of nisin applied. Effective levels of nisin to preserve foodstuffs reportedly range from 25–500 IU/g or more.

Bacteriocin produced by Pediococcus bacteria may be used in the present invention. Pediococci are lactic acid bacteria which are used as starter cultures in the manufacture of fermented sausages. Pediococci are known to inhibit the growth of both pathogenic and spoilage microorganisms. In the article by Hoover et al, "A Bacteriocin Produced by Pediococcus Species Associated with a 5.5-Megadalton Plasmid", *Journal of Food Protection, Vol.* 51. No. 1, pp 29–31 (January, 1988), which is hereby incorporated by reference in its entirety, a bacteriocin produced by Pediococcus species associated with a 5.5 megadalton plasmid is disclosed as effective to inhibit growth of several strains of Listeria monocytogenes. Bacteriocin from various species of Pediococci are known to be effective to inhibit, kill or prevent growth of Listeria monocytogenes. In particular, bacteriocin from Pediococcus acidilactici are known to be effective against Listeria monocytogenes. In the article by Pucci et al, entitled "Inhibition of Listeria Monocytogenes by Using Bacteriocin PA-1 Produced by Pediococcus acidilactici PAC 1.0", *Applied and Environmental Microbiology*, Vol. 54, No. 10, pp 2349–2353 (October, 1988), which is hereby incorporated by reference in its entirety, Pediococcus acidilactici is disclosed as producing a very effective anti-Listeria agent. The strain of P.acidilactici discussed in the article was designated PAC 1.0 and produced a bacteriocin designated PA-1 which was very effective against a Listeria monocytogenes at initial inoculum levels of $1.2 \times 10^2$ bacteria per milliliter. PA-1 bacteriocin is produced at Microlife Technics of Sarasota, Fla. Bacteriocins produced from either Pediococcus pentosaceus or Pediococcus acidilactici are referred to herein as pediocin.

Suitable chelating (sequestering) agents include carboxylic acids, polycarboxylic acids, amino acids and phosphates. In particular, the following compounds and their salts are among those believed to be useful:

Acetic acid
Adenine
Adipic acid
ADP
Alanine
B-Alanine
Albumin
Arginine
Ascorbic acid
Asparagine
Aspartic acid
ATP
Benzoic acid
n-Butyric acid
Casein
Citraconic acid
Citric acid
Cysteine
Dehydracetic acid
Desferri-ferrichrysin
Desferri-ferrichrome
Desferri-ferrioxamin E
3,4-Dihydroxybenzoic acid
Diethylenetriaminepentaacetic acid (DTPA)
Dimethylglyoxime
0,0-Dimethylpurpurogallin
EDTA
Formic acid
Fumaric acid
Globulin
Gluconic acid
Glutamic acid
Glutaric acid
Glycine
Glycolic acid
Glycylglycine
Glycylsarcosine
Guanosine
Histamine
Histidine
3-Hydroxyflavone
Inosine
Inosine triphosphate
Iron-free ferrichrome
Isovaleric acid
Itaconic acid
Kojic acid
Lactic acid
Leucine
Lysine
Maleic acid
Malic acid
Methionine
Methylsalicylate
Nitrilotriacetic acid (NTA)
Ornithine
Orthophosphate
Oxalic acid
Oxystearin
B-Phenylalanine
Phosphoric acid
Phytate
Pimelic acid
Pivalic acid
Polyphosphate
Proline
Propionic acid
Purine
Pyrophosphate
Pyruvic acid
Riboflavin
Salicylaldehyde
Salicyclic acid
Sarcosine
Serine
Sorbitol
Succinic acid
Tartaric acid
Tetrametaphosphate
Thiosulfate
Threonine
Trimetaphosphate
Triphosphate
Tryptophan
Uridine diphosphate
Uridine triphosphate
n-Valeric acid
Valine
Xanthosine Many of the above sequestering agents are useful in food processing in their salt forms which are commonly alkali metal or alkaline earth salts such as sodium, potassium or calcium or quaternary ammonium salts. Sequestering compounds with multiple valencies may be beneficially utilized to adjust pH or selectively introduce or abstract metal ions e.g. in a food system coating. Additional information on sequestering and chelating agents is disclosed in T. E. Furia (Ed.), *CRC Handbook of Food Additives,* 2nd Ed., pp. 271–294 (1972, Chemical Rubber Co.), and M. S. Peterson and A. M. Johnson (Eds.), *Encyclopedia of Food Science,* pp. 694–699 (1978, AVI Publishing Company, Inc.) which articles are both hereby incorporated by reference.

The terms "chelating agent" and "sequestering agent" are used herein as synonyms and are defined as organic or inorganic compounds capable of forming coordination complexes with metals.

Also, as the term "chelating agent" is used herein, it includes molecular encapsulating compounds such as cyclodextrin. The chelating agent may be inorganic or organic, but preferably is organic.

Preferred chelating agents are nontoxic to mammals and include aminopolycarboxylic acids and their salts such as ethylenediaminetetraacetic acid (EDTA) or its salts (particularly its di- and tri-sodium salts), and hydrocarboxylic acids and their salts such as citric acid. However, non-citric acid and non-citrate hydrocarboxylic acid chelating agents are also believed useful in the present invention such as acetic acid, formic acid, lactic acid, tartaric acid and and their salts.

As noted above, the term "chelating agent" is defined and used herein as a synonym for sequestering agent and is also defined as including molecular encapsulating compounds such as cyclodextrin. Cyclodextrins are cyclic carbohydrate molecules having six, seven, or eight glucose monomers arranged in a donut shaped ring, which are denoted alpha, beta or gamma cyclodextrin, respectively. As used herein, cyclodextrin refers to both unmodified and modified cyclodextrin monomers and polymers. Cyclodextrin molecular encapsulators are commercially available from American Maize-Products of Hammond, Ind. Cyclodextrin are further described in Chapter 11 entitled, "Industrial Applications of Cyclodextrin", by J. Szejtli, page 331–390 of *Inclusion Compounds,* Vol. III (Academic Press, 1984) which chapter is hereby incorporated by reference.

Mixtures of either Streptococcus-derived or Pediococcus-derived bacteriocins, such as nisin and pediocin, with one or more chelating agents may be usefully employed according to the present invention. Such mixtures may be solid in liquid suspensions or solutions. Unless otherwise noted, use of the term "solution" herein includes not only solids or liquids dissolved in a liquid but also solid-in-liquid suspensions or mixtures. Suitable solvents, diluents or carriers for the mixture of chelating agent and bacteriocin are water, alcohols, propylene glycol, oils such as mineral, animal or vegetable oil, glycerine or lecithin.

Although the commercially available bacteriocins may contain dairy products it may be advantageous for the bactericidal composition or food preservation preparation of the present invention to contain no added dairy products such as cheese, whey, curds or calcium-containing milk-based solids. It has been reported that calcium and magnesium ions may inactivate nisin. It may be, without wishing to be bound by the belief, that agents which chelate calcium and/or magnesium may be particularly advantageous. Mixtures of the present invention containing a mixture of bacteriocin and chelating agent may be applied to foodstuffs including dairy products and nondairy products such as sausages, other meats, vegetables and fruits by any conventional coating means such as spraying or dipping of the foodstuff into the solution or by use of an impregnated or coated film as described below. Such solutions may be formulated with widely varying pHs, but advantageously will be neutral or acidic. Acidic solutions are believed to enhance or maintain the antibacterial effective of these novel solutions and are therefore preferred. Solutions having a pH less than or equal to about 6 are preferred, and less than or equal to 5 especially preferred. Amounts of the bacteriocin and chelating agent components may vary depending upon such factors as: type of bacteriocin, type of chelating agent, pH, other constituents present (e.g. type of solution solvent), application i.e. type of foodstuff to which the materials are being applied, how applied (e.g. mixing with foodstuff or surface coating), subsequent processing conditions (e.g. heat treatment), a desired time period of effectiveness to kill or inhibit bacteria, and type of bacteria the foodstuff is being protected against, etc. One of ordinary skill in the art may determine appropriate amounts of bacteriocin and chelating agent without undue experimentation. Water is the preferred solvent for preparing a solution e.g. for a dipping treatment. Suitable amounts of bacteriocin in a mixture for treating foodstuffs such as sausage include from 5 to 250 parts per million (ppm) bacteriocin (by weight of total mixture) or more. Amounts less than 5 ppm are workable, but depending upon use may be less effective than higher concentration. Amounts greater than 250 ppm are also workable, but increasing concentrations have the disadvantage of increasing costs due to the expense of the bacteriocin. Concentrations between 50 and 150 ppm have been found to be effective and inexpensive, with concentrations of 150 ppm or more very effective at killing or inhibiting such pathogenic bacteria as Listeria monocytogenes e.g. on cooked frankfurter surfaces. The inventive solution may be used against other bacteria and is especially effective against gram positive bacteria. The amounts of chelating agent used may vary widely e.g. amounts between about 0.2 to about 0.8 or 3.0 weight percent or more may be usefully employed. The inventive composition may also contain other antimicrobial or antibacterial agents, or other additives such as colorants and flavorants e.g. gaseous or liquid smoke.

Food packaging films suitable for use in the present invention include polymeric films such as blown film, oriented film, stretch and shrink film, heat shrinkable bags and food casings. "Food packaging films" as that term is used herein are flexible sheet materials which are suitably 15 mils or less and preferably less than 10 mils (25 microns) in thickness.

Suitable films include regenerated cellulose and thermoplastic stretch or shrink films, and may be monolayer or multilayer films. Shrink films are preferably formed into heat shrinkable, biaxially-oriented bags.

Suitable films include food casings which are generally flexible films which are preferably tubular and may be formed of polymeric materials including cellulosic materials such as regenerated cellulose or cellulose carbamate or of plastics such as homopolymers or copolymers of polyolefins e.g. polypropylene, polyethylene, or polyamides, polyethylene terphthalate, polyvinylidene chloride copolymers or ethylene-vinyl acetate copolymers or of proteinaceous films such as collagen. Preferably, casings are tubular cellulosic casings, that are prepared by any one of the methods well known in the art. Such casings are generally flexible, thin-walled seamless tubing which is preferably formed of regenerated cellulose, and the like, in a variety of diameters. Also suitable are tubular cellulosic casings having a fibrous reinforcing web embedded in the wall thereof. Casings having a reinforcing web are commonly called "fibrous food casings", whereas cellulosic casings without the fibrous reinforcement, are herein referred to as "non-fibrous" cellulosic casings. Both natural and synthetic casings are contemplated by the present invention.

Casings conventionally known as "dry stock casings" may be used in the practice of this invention. Such casings generally have a water content within the range of from about 5 to about 14 weight percent water if non-fibrous casing, or within the range of from about 3 to about 8 weight percent water if fibrous casing, based on the total weight of casing including water.

Casings conventionally known as "gel stock casings" are casings which have higher moisture contents since they have not been previously dried, and such casings may also be used in the practice of this invention.

Casings conventionally known as "remoisturized casings" are dry stock casings to which moisture has been added, for example, to facilitate shirring and/or stuffing, and such casing may be used in the practice of this invention. Such casings generally have a water content within the range of about 15 to about 23 weight percent if non-fibrous casing, or within about 16 to about 35 weight percent if fibrous casing, based on the total weight of the casing including the water.

Antimicrobial agents suitable for use in the invention include any agents which may be effectively transferred from a food packaging film to a foodstuff to provide a foodstuff surface containing an antimicrobial agent which prevents or inhibits growth of microorganisms thereon, preferably even after removal of the film from contact with the foodstuff surface.

Suitable antimicrobial agents may be effective against molds, yeasts and/or bacteria. Suitable agents are believed to include antibacterial agents, which are effective to kill or inhibit bacteria, such as antibiotics e.g. nisin, natamycin, subtilin, or Pediococcus-derived bacteriocin, heat resistant enzymes such as lysozyme and other agents such as liquid smoke, parabens, sorbic acid, benzoic acid and mixtures thereof.

Such antimicrobial agents may include additives such as binding agents, buffers, emulsifiers, transfer aids or chelating agents such as ethylenediaminetetraacetic acid (EDTA) or its salts. These agents may enhance the antimicrobial effect of the agent or assist transfer from the packaging film to the foodstuff.

In particular, binding agents, e.g. water insoluble agents such as shellac and zein, may be used as transfer means or agents to provide transfer of an antimicrobial agent incorporated therewith from a packaging film to a foodstuff surface under moisturizing conditions. Preferred binding or transfer agents will have preferential substantivity to the foodstuff surface relative to the packaging film.

The food packaging film of the present invention will contain on or within the film an antimicrobial, preferably antibacterial, agent. Advantageously, such agent will be effective to kill, inhibit or prevent the growth of bacteria such as those from the genera Listeria, Salmonella and Clostridium and preferably the species Listeria monocytogenes.

Preferred antibacterial agents will be resistant to destruction or inactivation by heat treatment such as cooking or pasteurization temperatures and times. It is necessary that such preferred agents be able to survive heat treatment of the foodstuff within a packaging film and be effective subsequent to the heat treatment and removal of the film.

"Heat resistant", as that term is used herein, means that the antimicrobial agent, which is capable of being applied to a film in a controlled amount, withstands destruction, inactivation or losses due to heat treatment, e.g. by pasteurization or cooking, such that following heat treatment sufficient agent remains which is effective to kill, inhibit or prevent growth of microorganisms on foodstuffs to which it is applied. It should be understood that partial losses in the amount of agent or agent effectiveness may occur and that partial inactivation may also occur. However, it is sufficient that the remaining active agent be capable of protecting the foodstuff surface against pathogenic organisms such as Listeria.

In a typical application of the invention a tubular cellulosic food casing which may be impregnated or coated with an antimicrobial agent is used in the production of skinless wieners. In this well known sausage pasteurization process, the casing is stuffed with meat emulsion and formed into links. The encased meat emulsion which is given its shape by the casing is then cooked (heat treated) at a suitable temperature for sufficient time to achieve pasteurization. Typically, meat products, including sausages, are kept (even during pasteurization) at temperatures below about 190° F. (88° C.) prior to sale for home or institutional use. Generally, during pasteurization, foodstuffs such as processed meat will be brought to an internal temperature above about 145° F. (63° C.) and no higher than about 180° F. (82° C.) before removal of any film used to shape the product during processing. The surface temperature of these pasteurized foodstuffs typically does not exceed 190° F. (88° C.) and usually is below 170° F. (77° C.). The encased wieners may then be further processed or treated e.g. by showering with water and/or chilling. The casing is then removed by well known peeling means from the heat treated wieners and the wieners are repackaged for retail sale.

In one embodiment of the invention, the casing is a peelable casing which is particularly adapted for high speed peeling and removal by machinery. Casing is known in the art to be peelable by hand or by machines. Not all casing which is peelable by hand is adapted for the high speed peeling performed by machines such as the well known Apollo Peeler manufactured by the Ranger Tool Company, Inc. of Bartlett, Tenn. This and similar commercial peelers are able to remove casing from 40,000 to 60,000 sausages per hour.

Thus, the antimicrobial agent which is applied to the casing prior to stuffing must withstand the effects of this heat treatment and processing steps and remain effective to kill, inhibit, or prevent the growth of undesirable microorganisms following the heat treatment. Also, the agent must transfer to the foodstuff in an effective amount because the casing is removed. Microbial contamination of the wiener surfaces may occur in the time after removal of the casing and prior to packaging.

Alternatively, an antimicrobial agent such as the inventive antibacterial composition may be applied to a foodstuff via a coating on a film which is applied following heat treatment, or such composition may be applied directly by mixing with the foodstuff, spraying onto the foodstuff surface, or by dipping the foodstuff into the antibacterial compositon.

Therefore, the transferred or applied agent should be present in a sufficient amount and remain sufficiently effective following heat treatment, processing and casing removal to kill, inhibit or prevent growth of microbes, preferably Listeria monocytogenes for a sufficient length of time. This length of time for effectiveness for film applied agents should extend at least from the time of casing removal to packaging for sale e.g. to consumers or institutions. Advantageously, the agent would remain effective through the normal "sell by" or "expiration" date during which the food product is offered for sale by the retailer. Preferably, the effective time would extend past opening of the package by the consumer until the end of normal freshness period when food spoilage becomes apparent.

For skinless wieners typical times are: about ten minutes to one hour from casing removal to consumer packaging, about thirty days to sixty days from consumer packaging through normal retail sale; and about seven days or more from opening of consumer package under normal refrigerated storage and use. In any case, the desired lengths of time and normal shelf life will vary from foodstuff to foodstuff and those of ordinary skill in the art will recognize that packaging times and shelf-life times will vary depending upon the type of foodstuff (e.g. beef wieners, poultry, or cheese), the size of the foodstuff, the number of pieces packaged (consumer size or institutional size package) storage temperatures, processing conditions and packaging equipment.

Transfer of an antimicrobial agent from the inner surface of a film in direct contact with a contiguous foodstuff surface, according to one embodiment of the invention, is such that the agent is at least in part permanently transferred to the foodstuff during processing thereof in an amount sufficient to be effective to kill or inhibit growth of Listeria bacteria on the foodstuff surface notwithstanding subsequent peeling and removal of the casing.

The above example is exemplary and should not be taken as limiting the invention to use with wieners. The invention is applicable to any foodstuff particularly those which may benefit from application of a controlled amount of an antimicrobial agent to the foodstuff surface, particularly an antibacterial agent. It is contemplated that the compositions, films and methods of the invention have applicability to both animal-derived and plant-derived foodstuffs including but not limited to sausages of all types (such as beef, pork, chicken, turkey, fish, etc.) primal and subprimal cuts of meat, luncheon meats, hams, lamb, steak, hamburger, and poultry including chicken, turkey, duck, goose, as well as fish, and dairy products such as semi-soft and hard cheeses, processed cheese, and vegetable products including lettuce, tofu, coleslaw, soybean derived protein substitutes for meat, etc.

Advantageously, the film and/or method of the present invention may utilize an antimicrobial, preferably antibacterial, heat resistant agent such as lysozyme, nisin or Bacteriocin PA-1 produced by Pediococcus acidilactici PAC 1.0. Nisin is a polypeptide bacteriocin as described above.

Lysozyme is an enzyme which can cause bacteriolysis. Also known as N-acetylhexosaminodase or as 1,4 Beta-N-acetylmuramidase, lysozyme may be extracted from egg albumen and is widely found in nature. An enzyme that lyses or dissolves bacterial cells, lysozyme is effective against gram-positive bacteria such as Listeria monocytogenes. Lysozyme reportedly can withstand 100° C. with little loss of activity. See e.g. Proctor et al, "The Chemistry of Lysozyme and its Use as a Food Preservative and a Pharmaceutical", *CRC Critical Reviews in Food Science and Nutrition*, Vol. 26, Issue 4, pp. 359–395 (1988) which is hereby incorporated by reference. Lysozyme is available as a water-soluble white powder from Miles, Inc. of Elkhart, In.

The antimicrobial agents utilized according to the method and film of the present invention may be applied prior to or after film formation to intersperse, coat and/or impregnate the film with a controlled amount of agent per unit area of film. Mixtures of agents may also be used or a plurality of agents may be applied serially. Chelating agents, binding agents, emulsifiers and other additives may similarly be applied to the casing simultaneously (either in a mixture or separately), or may be applied serially.

In the present invention the antimicrobial agent and additives may be applied to the outer surface of a film such as a tubular casing by passing the casing through a bath of a solution containing the agent and/or additives. The agent may be allowed to soak into the casing prior to doctoring off any excess liquid by passing the casing through squeeze rolls or wipers, and the like, for an amount of time sufficient for the casing to incorporate the desired amount of agent and additives. The process of passing the casing through a treatment bath, (which may also be referred to as a "dip bath" or a "dip tank,") may also be referred to as a "dipping" step. The agent additives may alternatively be externally applied to the casing by methods other than dipping, such as spraying, brushing, roll-coating, printing and the like.

Alternatively, the agent or additives may be applied to the internal surface of a film tube such as a casing by any of several well-known procedures described in Chiu U.S. Pat. No. 4,171,381, the disclosure of which is incorporated by reference. These include slugging or bubble coating, spraying, and coating while shirring.

The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

Also, there is disclosed, for example, in U.S. Pat. No. 3,451,827 a spraying method for applying a variety of coating materials over the internal surface of small diameter casings. In Shiner et al, U.S. Pat. No. 3,378,379, a "slugging" method is used for applying coating materials to the internal surface of large diameter casings.

The antimicrobial agent may be applied to either side of the film as long as the film surface adapted for contact with the foodstuff is capable of allowing transfer of the agent to the foodstuff. For example, a cellulosic tubular food casing may be coated on the inside by slugging with a solution containing the agent as a solute or dispersion, or by spraying a controlled amount in either dry or liquid form. Then the inside of the casing may be stuffed with a food product such as hams, meat emulsion, or cheese in order to contact the foodstuff with the agent. Alternatively, the outer surface of the casing may be coated with the agent and the casing may be reverse stuffed by means well known (see e.g. U.S. Pat. No. 4,162,693) in the art to contact the surface of the foodstuff with the agent.

It is to be noted that the agent which is coated on the film surface, whether externally coated or internally coated, may or may not exist solely as a surface coating. For example, the agent may penetrate the cellulosic structure of a casing as the cellulose absorbs a liquid solvent of the solution containing the agent. Alternatively, a nonabsorptive thermoplastic film, or a cellulosic film having a barrier coating which prevents impregnation or a multilayer film which allows partial impregnation up to a barrier layer may be utilized. Accordingly, as used herein, the term "coating" is to be understood to mean that the film wall is not necessarily impregnated but may only have the antimicrobial agent on the surface thereof, but the term may also apply where the film wall is interspersed or impregnated with the agent. In any case, in use the agent should be releasable from the film and transferable to a foodstuff surface to the extent necessary to provide an antimicrobial effect on the surface of the foodstuff.

Solutions which contain antimicrobial agents may, according to the present invention, also contain other ingredients which may be suitably used in treating a film. For example, a tubular food casing, may be coated with e.g., glycerine and/or propylene glycol which may function as humectants or softening agents, and the like, either in a solution with the antimicrobial agent or separately.

Other ingredients which are normally used in the manufacture of, or for further treatment of, the food packaging film may also be present in or on the film if desired, and they may be used in the same manner and amounts as if the antimicrobial agent had not been used. For example, cellulose ethers and mineral oil are frequently used with cellulosic casings and antiblock and anti-static agents are frequently used with thermoplastic films.

The film may be in sheet form or tubular. It may be in rolls or cut lengths. Tubular film may be formed into bags by conventional techniques e.g. heat sealing and cutting across a tube or may be shirred. Film may be shirred by conventional methods.

Certain types of films such as regenerated cellulosic casing prior to shirring, may be dried and/or humidified to a water content suitable for shirring and/or further processing. The need for conventional drying and/or humidification depends on the water content of the casing after treatment, the type of casing, and the end use. Gel stock, dry stock and remoisturized casings may all be suitably employed in the present invention.

The invention will now be more clearly understood by reference to the following examples which are set forth as being merely illustrative of the invention and which are not intended, in any manner, to be limitative thereof. Unless otherwise indicated, all parts and percentages are by weight and all film or casing related percentages are based on the total weight of the film or casing. Bacterial plate counts are an arithmatic average for three plates unless otherwise indicated. Estimated plate counts were made by generally accepted procedures in the microbiological art.

EXAMPLES 1–28

The effectiveness of various test solutions and concentrations of the antimicrobial agents nisin and pediocin were examined by a liquid assay method against growth of pathogenic bacteria such as the gram-positive bacteria Listeria monocytogenes. Growth of total aerobic bacteria was also measured and the effectiveness similarly examined. Use of the chelating agents ethylenediamine- tetraacetic acid (disodium salt), citric acid, and cyclodextrin were also examined alone and with various concentrations of nisin or pediocin.

These examples were conducted using aseptic techniques well known to those skilled in the art of microbiology. Sterilized DIFCO brand tryptose broth at double strength was innoculated with at least about 10,000 colony forming units (cfu) per ml. of a mixture of two pathogenic strains of food isolated Listeria monocytogenes serotype 4b. This innoculated broth was then added to test tubes containing double strength antimicrobial test solutions using equal portions of innoculated broth and test solution. The test tubes were then capped and the contents thoroughly mixed. Tables 1a and 1b list test solution components and amounts. Following the test, the pH was measured for similarly mixed solutions of uninnoculated broth and test solutions with the pH values also reported in Tables 1a and 1b. The amounts for the test solution components were calculated based on a "double strength" solution which was then diluted with an equal volume of innoculated broth as described above. The amounts listed in Tables 1a and 1b were calculated assuming equal weights for equal volumes of the innoculated broth and the test solutions. The mixed innoculated test solutions were made in triplicate and incubated without agitation at about 30° C. For each test sample, an aliquot of 0.3 ml was aseptically withdrawn by pipet directly following mixing (zero (0) hours) as well as at 4, 8, 24 and 48 hours. Directly following removal, these aliquots were plated out on LPM agar and tryptic soy agar plates according to standard plate count procedures known to those skilled in the art of microbiology to determine Listeria and total aerobic bacterial counts. The selective listeria count was made using the U.S. Department of Agriculture (USDA) Food Safety and Inspection Service (FSIS), Microbiology Division method entitled, "FSIS Method for the Isolation and Identification of Listeria Monocytogenes From Processed Meat and Poultry Products" (For Use in Interim Laboratory Recognition Program) as described in the above titled paper, dated Nov. 4, 1988 by A. B. Moran and dated Nov. 8, 1988 by R. W. Johnston of FSIS and available from the FSIS which is hereby incorporated by reference. The bacterial count results for particular test solution components and concentrations are reported in Tables 1a and 1b as an arithmic average bacterial count of colony forming units (cfu) per ml for three replicate plates.

TABLE 1a

| Example No. | Test Solution Components | | | | | Listeria count (cfu/ml) Time (hr) | | | | |
|---|---|---|---|---|---|---|---|---|---|---|
| | A | Amount of A (wt. %) | B | Amount of B (wt. %) | pH | 0 | 4 | 8 | 24 | 48 |
| 1 | water | 100 | — | — | 7.2 | <10 | <10 | <10 | <10 | <10 |
| 2 | water | 100 | — | — | 7.3 | 31,000 | 37,000 | 10,000,000 | 300,000,000 | 7,700,000 |
| 3 | — | — | Na$_2$EDTA | 0.8 | 6.6 | 20,000 | 11,000 | 69,000 | 70,000 | 11,000 |
| 4 | — | — | citric acid | 0.8 | 4.2 | 11,000 | 2,700 | 35,000 | 180 | 730 |
| 5 | nisin | 0.0001 | — | — | 7.2 | <10 | <10 | <10 | <10 | <10 |
| 6 | nisin | 0.0010 | — | — | 7.3 | <10 | <10 | <10 | <10 | <10 |

TABLE 1a-continued

| | Test Solution Components | | | | | Listeria count (cfu/ml) Time (hr) | | | | |
|---|---|---|---|---|---|---|---|---|---|---|
| Example | | Amount of A | | Amount of B | | | | | | |
| No. | A | (wt. %) | B | (wt. %) | pH | 0 | 4 | 8 | 24 | 48 |
| 7 | nisin | 0.0050 | — | — | 7.2 | <10 | <10 | <10 | <10 | <10 |
| 8 | nisin | 0.0125 | — | — | 7.1 | <10 | <10 | <10 | <10 | <10 |
| 9 | nisin | 0.0001 | $Na_2EDTA$ | 0.8 | 6.5 | <10 | <10 | <10 | <10 | <10 |
| 10 | nisin | 0.0010 | $Na_2EDTA$ | 0.8 | 6.7 | <10 | <10 | <10 | <10 | <10 |
| 11 | nisin | 0.0050 | $Na_2EDTA$ | 0.8 | 6.7 | <10 | <10 | <10 | <10 | <10 |
| 12 | nisin | 0.0125 | $Na_2EDTA$ | 0.8 | 6.7 | <10 | <10 | <10 | <10 | <10 |
| 13 | nisin | 0.0001 | citric acid | 0.8 | 4.4 | <10 | <10 | <10 | <10 | <10 |
| 14 | nisin | 0.0010 | citric acid | 0.8 | 4.2 | <10 | <10 | <10 | <10 | <10 |
| 15 | nisin | 0.0050 | citric acid | 0.8 | 4.6 | <10 | <10 | <10 | <10 | <10 |
| 16 | nisin | 0.0125 | citric acid | 0.8 | 4.3 | 10 | <10 | <10 | <10 | <10 |
| 17 | pediocin | 0.0001 | — | — | 7.2 | 430 | 7,100 | 290,000 | 170,000,000 | 8,400,000 |
| 18 | pediocin | 0.0010 | — | — | 6.1 | 900 | 400 | 1,400 | 59,000 | * |
| 19 | pediocin | 0.0050 | — | — | 4.6 | 260 | 740 | 70 | 260 | 90 |
| 20 | pediocin | 0.0111 | — | — | 4.3 | 240 | 100 | 60 | 240 | 50 |
| 21 | pediocin | 0.0001 | $Na_2EDTA$ | 0.8 | 6.3 | 450 | 490 | 16,000 | 590 | 750 |
| 22 | pediocin | 0.0010 | $Na_2EDTA$ | 0.8 | 5.1 | 1,600 | 120 | 60 | 10,000 | 53,000 |
| 23 | pediocin | 0.0050 | $Na_2EDTA$ | 0.8 | 4.3 | 500 | 160 | 30 | 300 | 90 |
| 24 | pediocin | 0.0111 | $Na_2EDTA$ | 0.8 | 4.2 | 90 | 170 | 40 | 260 | 40 |
| 25 | pediocin | 0.0001 | citric acid | 0.8 | 4.3 | 430 | 180 | 420 | 10 | <10 |
| 26 | pediocin | 0.0010 | citric acid | 0.8 | 4.2 | 60 | 70 | 190 | 10 | <10 |
| 27 | pediocin | 0.0050 | citric acid | 0.8 | 4.1 | 540 | <10 | 20 | 350 | 130 |
| 28 | pediocin | 0.0111 | citric acid | 0.8 | 4.0 | 90 | 50 | 60 | 210 | 50 |

*2 plates averaged 18,000 cfu while the third plate count was 5,000,000.

TABLE 1b

| | Test Solution Components | | | | | Total Aerobic Bacteria Count (cfu/ml) Time (hr) | | | | |
|---|---|---|---|---|---|---|---|---|---|---|
| Example | | Amount of A | | Amount of B | | | | | | |
| No. | A | (wt. %) | B | (wt. %) | pH | 0 | 4 | 8 | 24 | 48 |
| 1 | water | 100 | — | — | 7.2 | <10 | <10 | 110 | 10,000,000 | 480,000,000 |
| 2 | water | 100 | — | — | 7.3 | 9,100 | 23,000 | 550,000 | 560,000,000 | 24,000,000 |
| 3 | — | — | $Na_2EDTA$ | 0.8 | 6.6 | 5,900 | 6,900 | 7,300 | 88,000 | 12,000 |
| 4 | — | — | citric acid | 0.8 | 4.2 | 6,500 | 4,200 | 3,500 | 1,300 | 640 |
| 5 | nisin | 0.0001 | — | — | 7.2 | <10 | <10 | 130 | 9,100,000 | 45,000,000 |
| 6 | nisin | 0.0010 | — | — | 7.3 | <10 | 20 | <10 | 3,700,000 | 41,000,000 |
| 7 | nisin | 0.0050 | — | — | 7.2 | <10 | <10 | <10 | 9,500 | 20,000,000 |
| 8 | nisin | 0.0125 | — | — | 7.1 | <10 | <10 | <10 | 220 | + |
| 9 | nisin | 0.0001 | $Na_2EDTA$ | 0.8 | 6.5 | <10 | <10 | <10 | <10 | 110 |
| 10 | nisin | 0.0010 | $Na_2EDTA$ | 0.8 | 6.7 | <10 | 10 | <10 | <10 | <10 |
| 11 | nisin | 0.0050 | $Na_2EDTA$ | 0.8 | 6.7 | <10 | <10 | <10 | <10 | <10 |
| 12 | nisin | 0.0125 | $Na_2EDTA$ | 0.8 | 6.7 | <10 | <10 | <10 | <10 | <10 |
| 13 | nisin | 0.0001 | citric acid | 0.8 | 4.4 | <10 | <10 | 10 | <10 | <10 |
| 14 | nisin | 0.0010 | citric acid | 0.8 | 4.2 | <10 | <10 | <10 | <10 | <10 |
| 15 | nisin | 0.0050 | citric acid | 0.8 | 4.6 | <10 | <10 | <10 | <10 | <10 |
| 16 | nisin | 0.0125 | citric acid | 0.8 | 4.3 | 30 | <10 | <10 | <10 | <10 |
| 17 | pediocin | 0.0001 | — | — | 7.2 | 780 | 5,100 | 61,000 | 720,000,000 | 180,000,000 |
| 18 | pediocin | 0.0010 | — | — | 6.1 | 1,300 | 1,100 | 610 | 1,900,000 | 6,900,000 |
| 19 | pediocin | 0.0050 | — | — | 4.6 | 7,000 | 5,700 | 11,000 | 23,000 | 1,200 |
| 20 | pediocin | 0.0111 | — | — | 4.3 | 22,000 | 20,000 | 14,000 | 80,000 | 1,500 |
| 21 | pediocin | 0.0001 | $Na_2EDTA$ | 0.8 | 6.3 | 520 | 510 | 140 | 1,300 | 950 |
| 22 | pediocin | 0.0010 | $Na_2EDTA$ | 0.8 | 5.1 | 1,300 | 800 | 570 | 140,000 | 2,300,000 |
| 23 | pediocin | 0.0050 | $Na_2EDTA$ | 0.8 | 4.3 | 8,700 | 6,800 | 5,700 | 3,900 | 16,000 |
| 24 | pediocin | 0.0111 | $Na_2EDTA$ | 0.8 | 4.2 | 14,000 | 20,000 | 18,000 | 45,000 | 1,700 |
| 25 | pediocin | 0.0001 | citric acid | 0.8 | 4.3 | 520 | 510 | 140 | 1,300 | 950 |
| 26 | pediocin | 0.0010 | citric acid | 0.8 | 4.2 | 990 | 210 | 740 | ++ | +++ |
| 27 | pediocin | 0.0050 | citric acid | 0.8 | 4.1 | 8,000 | 5,500 | 12,000 | 3,600 | 830 |
| 28 | pediocin | 0.0111 | citric acid | 0.8 | 4.0 | 18,000 | 20,000 | 15,000 | 32,000 | 2,300 |

+ 2 plates were each counted at <10 while the third plate count was 2,800,000.
++ The three plate counts were 850 cfu; 26,000 cfu, and 1,000,000.
+++ The three plate counts were 400 cfu; 320 cfu, and 1,300,000.

Examples 1 and 2 are control examples (not of the invention). In Examples 1 and 2 the test solutions were deionized water, which were mixed with broth as described above (except Example 1 was not innoculated) and run as controls. Example 2 was innoculated and run as controls. The test results indicate that for the uninnoculated control (Example 1) there were no significant levels of Listeria present during the 48 hour test period and that growth of total aerobic bacteria was unapparent until the 8 hour test period when such growth proceeded at a rapid pace from the 8 hour period through the 24 hour and 48 hour test periods. The innoculated deionized water control (Example 2) exhibited a lag phase from the initial count of about 31,000 cfu per ml through the 4 hour test sample (37,000 cfu per ml) followed by explosive growth at 8 hours (10,000,000 cfu per ml) and 24 hours (300,000,000 cfu per ml), followed by a die off phase at 48 hours (7,700,000 cfu per ml). This die off phase following explosive growth is believed due to factors related to the immediately preceeding high growth such as exhaustion of nutrients or production by the test bacteria (Listeria) of inhibiting waste products. Similarly, total aerobic bacteria counts exhibit a period of slow growth followed by explosive growth and then a "die off". In making the total aerobic bacterial count for Examples 1–28, there was evidence of sporeforming bacilli in many examples. Typically, these organisms represent the difference between the total aerobic and Listeria bacteria counts.

Two different chelating agents, namely (1) the disodium salt of EDTA ($Na_2EDTA$), and (2) citric acid were tested for antibacterial activity by placing 0.8 weight percent of each in deionized water and innoculating as described above. Example 3 ($Na_2EDTA$) was found to inhibit growth of Listeria organisms with a maximum number of organisms determined at 24 hours followed by a die off phase at 48 hours. Example 4 (citric acid) was also effective to kill and inhibit Listeria although the level of organisms fluctuated over the 48 hour test period with a high average count of 35,000 cfu per ml reported at 8 hours. With respect to total aerobic bacteria counts, $Na_2EDTA$ was inhibitory with a reported high average plate count of 88,000 cfu per ml at 8 hours compared to 560 million cfu per ml for the innoculated control (Example 2). Citric acid was very effective; it produced a steady reduction in the number of total aerobic bacteria over the test period from an initial average count of 6,500 cfu per ml to a low of 640 cfu per ml at 48 hours. The effectiveness of citric acid may have been due at least in part to a pH effect where low pH may restrict bacterial growth as known in the art.

In Examples 5–16 test solutions utilized various concentrations of nisin alone and with citric acid and $Na_2EDTA$. The average Listeria plate counts for all of these examples were less than 10 cfu per ml for all test periods including the zero hour test conducted immediately following innoculation. Example 2 (the innoculated control) as well as Examples 3 and 4 (containing only chelating agents) were all determined as having average Listeria counts of at least 10,000 cfu per ml immediately following innoculation (0 hr). Therefore, it would appear that all of the similarly innoculated samples containing nisin under these test conditions acted to kill substantially all Listeria upon mixing. That no growth of Listeria was seen following the initial test period may indicate either initial eradication or a significant reduction in Listeria followed by very effective inhibition.

The results for the total aerobic bacteria plate counts for Examples 5–16 demonstrate the effect of nisin concentration in the absence and presence of a chelating agent upon total bacteria growth.

Examples 5–8 were test solutions of varying concentrations of nisin (in the form of Nisaplin brand nisin preparation available from Aplin & Barrett Ltd.) in deionized water. Examples 5–8 all show an initial kill of the innoculated bacteria to a level of less than 10 cfu for each concentration of nisin. The total aerobic bacteria counts obtained by plating the innoculated test solutions onto nonselective tryptic soy agar should be a mixture of the intentionally added Listeria and incidental contamination of other microorganisms. By comparison, Examples 2–4 all show initial counts of from 5,900–9,100 cfu per ml, whereas the uninnoculated control (Example 1) had an initial count of less than 10 cfu per ml.

Comparison of Example 5 which contains 1 ppm nisin to the innoculated control (Example 2) shows that nisin is effective, particularly initially to kill aerobic bacteria and control at least initially the growth of aerobic bacteria. However, by the 24 hour test period, the 8 hour average count of 130 cfu per ml for Example 5 had grown explosively to 9,100,000 cfu per ml. This growth is less than that for the innoculated control (Example 2) and about the same as that for the uninnoculated control (Example 1) at 24 hours. Rapid growth of total aerobic bacteria continued in Example 5 resulting in an average plate count of 45,000,000 cfu per ml at 48 hours. Comparison of Example 5 with Examples 6–8 demonstrates that increasing the concentration of nisin will act to delay onset of the explosive growth phase for total aerobic bacteria and reduce the average total aerobic bacteria count for each time period relative to the other test solutions containing less nisin.

Examples 9–12 parallelled Examples 5–8 in nisin concentration, but also contains 0.8 weight percent of a chelating agent, the disodium salt of EDTA (hereinafter $Na_2EDTA$). The results for the average total aerobic bacteria plate counts are, except for 110 cfu per ml at 48 hours for Example 9, all less than 10 cfu per ml. Thus a comparison of e.g. the 24 hour average bacteria counts for Example 3 (0.8 wt. % $Na_2EDTA$), Example 5 (1 ppm nisin), and Example 9 (the combination of 1 ppm nisin and 0.8 $Na_2EDTA$) show average total aerobic bacteria counts of 88,000 cfu per ml, 9,100,000 cfu per ml and <10 cfu per ml, respectively. The surprising reduction of bacteria to less than 10 cfu per ml for the combination of nisin and chelating agent is unexpected. Nisin and chelating agents such as $Na_2EDTA$ appear to act synergistically to reduce the average number of total aerobic bacteria as shown by comparison of the 24 hour and 48 hour data of Examples 3, and 5–12. In Examples 13–16, a second chelating agent was tried in combination with nisin. These examples were similar to Examples 5–8, but each also contained 0.8 weight percent citric acid. Except for an initial average count of 30 cfu per ml for Example 16, all of these test solutions which contained the combination of citric acid and nisin had average total aerobic plate counts of less than 10 cfu per ml. The above test results demonstrate the antibacterial activity of the individual chelating agents and nisin, as well as the surprisingly and unexpectedly good activity of the combination of nisin and chelating agent against total aerobic bacteria levels. This suggests that the combination of nisin with a chelating agent such as $Na_2EDTA$ or citric acid works with an unexpected efficiency to kill and inhibit bacteria and may therefore be applied to a foodstuff to dramatically improve shelf life.

In Examples 17–28 the test solutions contain various concentrations of pediocin with and without the chelating agents $Na_2EDTA$ and citric acid. The pediocin was added as a preparation which was produced in skim milk according to generally known procedures in the art of preparing pediocin by culturing of Pediococcus acidilacti in skim milk.

Referring to the average Listeria plate counts in Table 1a, it is apparent that pediocin alone kills and inhibit the growth of Listeria, but not as effectively as nisin on an equal weight basis. Results indicate that increasing the concentration of pediocin above 1 ppm generally reduces the number of Listeria in initial counts. Amounts of pediocin at a level of 10 ppm or less inhibited growth of Listeria relative to the innoculated control (Example 2), but Listeria did continue to grow whereas Pediocin at a level of 50 ppm or greater not only seems to reduce the initially reported bacteria counts, but also prevented the Listeria count from increasing by any log factor i.e. the highest average Listeria count during the 48 hour test period was 740 cfu per ml. In Examples 21–24 the test solutions were similar to those for Examples 17–20 except that 0.8 weight percent of the chelating agent $Na_2EDTA$ was present with the various concentrations of pediocin. As demonstrated by comparison of Examples 21–24 to Example 3 and Examples 17–20, the combination of pediocin and $Na_2EDTA$ was unexpectedly effective at killing and inhibiting the growth of Listeria over the 48 hour test period, particularly for low levels of pediocin (10 ppm and less). In Examples 25–28, these test solutions substituted another chelating agent, citric acid, for the $Na_2EDTA$ of Examples 21–24. The average Listeria plate counts for the pediocin and citric acid containing solutions are surprisingly low and indicate a synergistic efficiency in killing and inhibiting Listeria bacteria. For example, a comparison of the average plate counts at 24 hours follows: for 0.8 weight % of citric acid alone—70,000 cfu per ml (Example 4); for 1 ppm pediocin 170,000,000 cfu per ml, (Example 17); and for the combination of 0.8 wt. % citric acid and 1 ppm pediocin—10 cfu per ml (Example 25). The 10 cfu per ml result for Example 25 is remarkably low. The logarithmic reductions which may be achieved by the combination of pediocin and chelating agent relative to the individual components alone is significant and unexpected.

With respect to average total aerobic bacteria counts, pediocin appears to delay and reduce growth with higher concentrations of pediocin being more effective, particularly at the 24 and 48 hour test periods. Use of pediocin and the chelating agents $Na_2EDTA$ and citric acid were also effective at inhibiting growth of total aerobic bacteria.

The above Examples 1–28 demonstrate the effectiveness of various antimicrobial agents against pathogenic and aerobic bacteria. Unexpectedly, the combination of nisin and a chelating agent such as $Na_2EDTA$ or citric acid was shown to be surprisingly effective against total aerobic bacteria relative to use of either component alone. Also, unexpected is the surprising effectiveness of the combination of pediocin and a chelating agent such as $Na_2EDTA$ or citric acid relative to the individual components against pathogenic Listeria bacteria.

EXAMPLES 29–43

Various antimicrobial agents applied to foodstuffs such as wiener sausages were tested for effectiveness against subsequent spoilage. Freshly prepared skinless (casing removed) pasteurized frankfurters typically will have surface bacteria of less than 1,000 cfu per frankfurter directly following vacuum packaging during typical commercial manufacturing processes. When bacterial counts reach the $10^7$ to $10^8$ or higher order of magnitude of cfu per frankfurter, then spoilage is typically visually evident. Common spoilage bacteria for vacuum packaged refrigerated processed meats includes lactobacillus. In particular, the effectiveness of various solutions in protecting foodstuffs dipped therein against growth of pathogenic bacteria such as Listeria monocytogenes was tested.

Frankfurters formed from typical meat emulsion and processing were utilized. Frankfurters were prepared by stuffing a beef/pork meat emulsion into E-Z Peel NOJAX® Brand cellulosic casings (commercially available from Viskase Corporation of Chicago, Ill.) and cooking (approximately 1 hour) in a gas-fired, humidity controlled smoke house at a relative humidity of about 20% until the frankfurters reached an internal temperature of at least 160° F. (71° C.) under conditions of no added smoke. The casing was then peeled off by a commercial peeler and discarded. The peeled frankfurters were stored in a polyethylene bag at about 4° C. briefly until microbiological testing began. The meat emulsion was made from the ingredients listed in Table A by chopping and mixing for about five minutes in a commercial bowl chopper and then mincing through a commercial emulsion mill to achieve a uniform meat emulsion. A chemical analysis of the pasteurized frankfurters revealed 56.9% moisture, 27.2% fat, 12.2% protein, 2.5% ash, 1.90% salt, 65 ppm sodium nitrite and a frankfurter surface pH of 6.40.

TABLE A

| | Beef/Pork Emulsion | |
|---|---|---|
| | Weight | |
| Ingredients | lb. | (Kg) |
| Beef Chuck | 30 | (13.5) |
| Regular Pork Trimmings | 20 | (9) |
| Water/Ice | 12.5 | (5.6) |
| Salt | 1.125 | (0.506) |
| Dextrose | 1.0 | (0.45) |
| Frankfurter Spices | 0.5 | (0.225) |
| Prague Powder (Sodium nitrite) | 0.125 | (0.05625) |

Refrigerated frankfurters stored at 40° F. (4° C.) were surface coated with test solutions by submerging individual frankfurters in a test liquid for about 30 seconds with as little handling as possible, followed by a period of about 30 seconds during which each frankfurter was held vertically to drain. The coated frankfurters were then innoculated (except for an uninnoculated control) with a mixture of three strains of pathogenic Listeria monocytogenes (which were cultured from strains isolated from either a meat product or meat plant) at a level of approximately 10,000–30,000 colony forming units (cfu) per frankfurter. Immediately following innoculation, frankfurters from each example were tested by washing with a sterile buffer which was then plated using methods described above into both nonselective tryptone glucose yeast (TGY) agar and Listeria selective LPM agar and incubated to determine the presence of total aerobic bacteria and Listeria.

Following innoculation, frankfurters were individually packaged in commercially available PERFLEX® 51B Barrier Bags (manufactured by Viskase Corporation of Chicago, Ill.). These bags were evacuated and heat sealed under high vacuum with a commercial evacuator/sealer to provide an oxygen and moisture barrier to the environment. The test samples were stored at ambient temperatures (about 25° C.) for 2 days and then tested for total bacteria and Listeria counts as described above for samples following innoculation. The test solutions and bacteria counts are reported in Table 2.

TABLE 2

| Example No. | Test Solution Components | | | | Listeria (cfu/frankfurter) | | Total Aerobic Bacteria (cfu/frankfurter) | |
|---|---|---|---|---|---|---|---|---|
| | A | Amount of A (wt. %) | B | Amount of B (wt. %) | Initial | Day 2 | Initial | Day 2 |
| 29 | water+ | 100 | — | — | <10 | <10 | 2,600 | 590,000 e |
| 30 | water+ | 100 | — | — | 10,000 | 38,000,000 e | 32,000 | 65,000,000 e |
| 31 | — | — | Na$_3$EDTA | 3.0 | 36,000 | 31,000,000 e | 61,000 | 43,000,000 e |
| 32 | nisin* | 0.01 | — | — | <10 | <10 | 940 | 51,000,000 e |
| 33 | nisin* | 0.00066 | Na$_3$EDTA | 3.0 | <10 | 1,800,000 e | 1,200 | 53,000,000 e |
| 34 | nisin* | 0.0034 | Na$_3$EDTA | 3.0 | <10 | 1,800++ | 6,400 | 62,000,000 e |
| 35 | nisin* | 0.01 | Na$_3$EDTA | 3.0 | <10 | 800 | 1,400 | 75,000 |
| 36 | nisin** | 0.0040 | — | — | <10 | 1,200,000 e | 2,700 | 53,000,000 e |
| 37 | nisin** | 0.00047 | Na$_3$EDTA | 3.0 | 2,300 | 2,300,000 e | 4,600 | 79,000,000 e |
| 38 | nisin** | 0.0024 | Na$_3$EDTA | 3.0 | 60 | 340,000 | 1,300 | 42,000,000 e |
| 39 | nisin** | 0.0040 | Na$_3$EDTA | 3.0 | 30 | 26,000 | 670 | 79,000 |
| 40 | — | — | citric acid | 3.0 | 4,800 | 1,300,000 e | 6,500 | 7,600,000 e |
| 41 | nisin* | 0.01 | citric acid | 3.0 | <10 | <10 | 60 | 8,100 |
| 42 | — | — | cyclodextrin | 3.0 | 21,000 | 2,800,000 e | 37,000 | 46,000,000 e |
| 43 | nisin* | 0.01 | cyclodextrin | 3.0 | <10 | 27,000 | 1,900 | 9,300,000 e | e - estimate
+Deionized water
++Average of two plates only; third plate covered with Staphlococcus growth preventing Listeria count.
*This nisin was added as a preparation produced from fermentation of milk available in powdered form from Aplin & Barrett Ltd. of Trowbridge, England under the trademark "Nisaplin", (1.0 weight percent of the nisin preparation Nisaplin contains 0.025 weight percent of nisin).
**This nisin was also added as a preparation produced in skim milk according to generally known procedures in the art of preparing nisin by culturing of Streptococcus lactis in skim milk.

In Examples 29–43, the antimicrobial agents were dissolved or suspended in deionized water. The test solutions reported in Table 2 were all water based.

Example 29 differed from the other examples in that its frankfurters were dipped in a deionized water sample only and were not subsequently innoculated with Listeria organisms. Example 29 was run as an uninnoculated control (not of the invention) to examine the growth of any background organisms already present e.g. on the frankfurters, or introduced by incidental contamination. The results for Example 29 indicate that there were no significant levels of Listeria detected during the two day test period while the average plate count for total aerobic bacteria increased from 2,600 to an estimated 590,000 cfu per frankfurter.

Example 30 was run as an innoculated control (not of the invention) with deionized water as the test solution. This Example was identical to Example 24 except that the dipped frankfurters were innoculated with Listeria organisms. Over the two day test period, growth of Listeria was explosive reaching an estimated average plate count of 38,000,000 cfu per frankfurter. The total aerobic bacteria count showed a similar explosive growth.

In Example 31, a 3 weight percent solution of the trisodium salt of EDTA did not appreciably affect either the Listeria growth or the total aerobic growth on frankfurters over the two day test period.

In Examples 32–35 various concentrations of nisin were tested alone and in combination with the chelating agent Na$_3$EDTA on frankfurters. In these examples nisin was added as a preparation produced from fermentation of milk. This nisin preparation is commercially available under the brand name "Nisaplin" from Aplin & Barrett of Trowbridge, England. In the test solutions to obtain, for example, 0.01 weight percent of nisin it was necessary to add 0.4 weight percent of the nisin preparation (Nisaplin).

Although all of the test solution coated frankfurters of Examples 30–43 were believed to be initially inoculated with at least about 10,000 cfu per frankfurter of Listeria, the average initial plate counts for Listeria for Examples 32–35 were all less than 10 cfu. These low initial counts are believed to indicate that substantial numbers of Listeria were killed upon contact with the nisin-containing coating. All of the nisin containing coating solutions were effective at reducing growth of Listeria over the two day period with the solutions containing high amounts of nisin being more effective at inhibiting Listeria. Example 32 in which the frankfurter coating contained nisin alone at a test solution level of 100 ppm appeared to be most effective over the two day period. However, this may have been due to either an initial eradication, or a significant reduction followed by very effective inhibition. The test results for total aerobic bacteria suggest that 100 ppm nisin and 3.0 weight percent of Na$_3$EDTA act synergistically to hold down total aerobic bacterial growth on coated, cooked or pasteurized meat surfaces as seen by comparison of Example 35 with Examples 31 and 32.

In Examples 36–39, a noncommercial nisin preparation was utilized. This nisin preparation was made by culturing Streptococcus lactis in skim milk using commonly known procedures. This noncommercial nisin preparation was initially reported by the supplier to have a nisin concentration of 352 ppm and later reassayed by the supplier to have a nisin concentration of 250 ppm. The supplier reports that the quantitative analysis of this nisin was performed using a biological assay test which measures the activity of nisin against Micrococcus flavus bacteria. This is an accepted method in the nisin art of quantifying nisin, however it is a biological method which may be more difficult to conduct with precision relative to nonbiological methods. Examples 36–39 were all prepared using this noncommercial nisin preparation which was first assayed at 352 ppm and later assayed at 250 ppm and the values reported in Table 2 are based upon the second assay of 250 ppm (which the supplier believes to be accurate). The amount of nisin used in Examples 36–39 was prepared by dilution of this nisin preparation. Following are the weight percentage quantities of nisin used which are based upon the 250 ppm assay with corresponding values based upon the 352 ppm assay given in parentheses: Example 36 is 0.0040 (0.0057) wt. %; Example 37 is 0.00047 (0.00066) wt. %; Example 38 is 0.0024 (0.0034) wt. %; and Example 39 is 0.0040 (0.0057) wt. %. Since all of the Examples 36–39 were made from the same batch of nisin, the relative amounts remain the same i.e. Example 36 had the same amount as Example 39, and Example 37 had a nisin concentration which was 11 ½% of that for Example 36 and 39, and the nisin concentration of Example 38 was 60% of that for Examples 36 and 39.

For either assay the amount of nisin present in Examples 36 and 39 is believed to be between the amounts reported for the commercially available nisin reported in Examples 34 and 35. The test solutions of Examples 34, 35 and 39 were the same except for the source and amount of nisin used. Example 36 tested frankfurters coated with a solution of nisin at 40 ppm without the chelating agent $Na_3EDTA$. Comparison of results for Example 36 with Examples 31 and 39 indicate that use of the combination of nisin and the chelating agent $Na_3EDTA$ produced a surprising and unexpected reduction in both average plate counts for Listeria and total aerobic bacteria for the two day test period.

Other chelating agents were examined with unexpectedly good inhibitory and killing action against total aerobic bacteria for the combination of nisin and either citric acid or cyclodextrin. The nisin/cyclodextrin and nisin citric acid combination also demonstrated very good effectiveness against Listeria growth on food surfaces. The cyclodextrin used in these examples was beta-cyclodextrin which is commercially available from American Maize-Products Company of Hammond, Ind.

Examples 29–43 demonstrate that a bactericidal composition comprising nisin and a chelating agent such as $Na_3EDTA$, citric acid, or cyclodextrin may be utilized to kill and inhibit pathogenic bacteria and prolong food shelf life. The novel composition comprising a combination of nisin and chelating agent appears to be useful as a food preservative. Here the solution was applied to frankfurters surfaces by dipping, but it is believed that other methods of application may be employed, as discussed previously, such as spraying, mixing or contact with a releasably coated film and that the inventive combination may be employed not only with processed meat, but other foods including fruits, vegetables, grain products, dairy products, eggs, as well as meats, poultry and fish. The composition is believed to have utility for fresh, raw, cooked, pasteurized and sterilized food products. Synergistic efficiency in killing and inhibiting pathogenic and food spoilage organisms is demonstrated by the above test results.

EXAMPLES 44–55

Various antimicrobial agents were applied to frankfurters by dipping each into water based test solutions containing the agents. The dipped frankfurters were innoculated with bacteria and tested for surface growth of bacteria over time. The procedures for this test were substantially the same as those followed for Examples 29–43 above except as indicated below. The meat emulsion utilized here was substantially the same recipe used for Examples 29–43 except that no dextrose was used in the meat emulsion for Examples 44–55. The frankfurter cooking/processing conditions were the same except that the relative humidity was 25% and the frankfurters were cooked until reaching an internal temperature of 162° F. (72° C.). A chemical analysis of the now pasteurized frankfurters revealed a surface pH of 6.36, and 56.3% moisture, 28.7% fat, 12.4% protein, 2.6% ash, 1.94% salt and 56 ppm of sodium nitrite. Although no smoke was added, a smoke analysis was done which indicated 24.6 mg of acid, 0.3 mg phenol and 7.1 mg of carbonyl compounds all per 100 g of cooked frankfurter. These amounts were believed due to a residual build-up of smoke constituents in the smokehouse.

The frankfurters were coated in the test solutions by immersion for thirty seconds followed by draining for thirty seconds. The coated frankfurters were then innoculated with a mixture of three strains of pathogenic Listeria monocytogenes by pipetting 0.05 ml (about 100 cells) of innoculum onto each frankfurter. The innoculum was spread with a sterile cotton swab. The frankfurters were then packaged in two layers of four into commercially available PERFLEX® 51B Barrier Bags (manufactured by Viskase Corporation of Chicago, Ill.). These bags of thermoplastic film were evacuated and heat sealed under high vacuum with a commercial evacuator/sealer to provide an oxygen and moisture barrier to the environment. Separate sets of packages were prepared for frankfurters coated with each test solution. Each sealed package of eight frankfurters was stored at about 40° F. (4.4° C.). Triplicate packages were analyzed initially (Day 0) and at 14, 28 and 42 days of storage. For assaying, one frankfurter was aseptically removed from each package being tested and placed in a bag with 10 ml. of phosphate buffer, then shaken to rinse off bacterial cells adhering to the frankfurter surface. Serial decimal dilutions were plated out on LPM agar and TGY agar as for examples 29–43 above. The arithmatic average plate count results from the three replicate packages tested are reported in Table 3.

TABLE 3

| Example No. | Test Solution Components | | | | Listeria count (cfu/frankfurter) Time (day) | | | |
| --- | --- | --- | --- | --- | --- | --- | --- | --- |
| | A | Amount of A (wt. %) | B | Amount of B (wt. %) | 0 | 14 | 28 | 42 |
| 44 | uninnoculated control* | 100% | — | — | <10 | <10 | <10 | <10 |
| 45 | innoculated control* | 100% | — | — | 340 | 140,000 | 1,400,000,000 | ND |
| 46 | — | — | $Na_2EDTA$ | 0.8 | 190 | 22,000 | 2,600,000,000 | ND |
| 47 | propylene glycol | 2.0 | — | — | 340 | 340,000 | 1,200,000,000 | ND |
| 48 | propylene glycol | 2.0 | $Na_2EDTA$ | 0.8 | 240 | 44,000 | 3,000,000,000 | ND |

TABLE 3-continued

| | Test Solution Components | | | | | | | |
|---|---|---|---|---|---|---|---|---|
| 49 | propylene glycol | 1.8 | Charsol-10 | 0.5 | 990 | 300,000[++] | 3,200,000,000 | ND |
| 50 | sodium benzoate | 0.5 | Na$_2$EDTA | 0.8 | 940 | 66,000 | 28,000,000 | ND |
| 51 | potassium sorbate | 0.25 | Na$_2$EDTA | 0.8 | 260 | 190,000 | 1,800 | ND |
| 52 | lysozyme | 0.025 | Na$_2$EDTA | 0.8 | 460 | 10,000 | 120,000,000 | ND |
| 53 | parabens** | 0.3 | Na$_2$EDTA | 0.8 | 140 | 27,000 | 1,300,000,000 | ND |
| 54 | nisin | 0.01 | Na$_2$EDTA | 0.8 | <10 | 20 | <10 | <10 |
| 55 | nisin | 0.025 | Na$_2$EDTA | 0.8 | <10 | <10 | <10 | <10 |

| Example No. | Total Aerobic Bacteria (cfu/frankfurter) Time (day) | | | |
|---|---|---|---|---|
| | 0 | 14 | 28 | 42 |
| 44 | <10 | 40 | + | 3,200,000 |
| 45 | 120 | 630,000 | 1,900,000,000 | ND |
| 46 | 100 | 51,000 | 530,000,000 | ND |
| 47 | 180 | 430,000 | 1,100,000,000 | ND |
| 48 | 390 | 49,000 | 1,600,000,000 | ND |
| 49 | 790 | 440,000[++] | 470,000,000 | ND |
| 50 | 1,100 | 16,000 | 40,000,000 | ND |
| 51 | 80 | 490,000 | 1,000,000[aa] | ND |
| 52 | 1,200 | 12,000 | 112,000,000 | ND |
| 53 | 130 | 23,000 | 710,000,000 | ND |
| 54 | <10 | <10 | <10[b] | <10 |
| 55 | 10 | <10 | [c] | 790,000[cc] |

ND Not Determined
*Butterfields Buffered Phosphate Diluent.
**Also included as third component 1.8 wt. % propylene glycol.
[+]The three plate counts were <10 cfu; 22,000 cfu; and 83,000,000 cfu.
[++]Two of the three plate counts were too numerous to count at the dilution plated; the third plate count is reported.
[a]Average of two plates; the third plate was 16,000,000,000 cfu.
[aa]Average of two plates; the third plate was 2,500,000,000 cfu.
[b]Average of two plates; the third plate count was 3,900 cfu.
[c]The three plate counts were: <10 cfu; 230 cfu; and 70,000 cfu.
[cc]Average of two plates; the third plate count was <10 cfu.

The frankfurters for Examples 44 and 45 were coated by dipping each frankfurter into a solution of Butterfield's buffered phosphate diluent which contained about 42.5 ppm of potassium orthophosphate in deionized water adjusted to a pH of 7.2. Examples 44 and 45 differed in that only the frankfurters of Example 45 were inoculated with Listeria. Therefore, Example 44 served as an uninoculated control (not of the invention) and Example 45 served as an innoculated control (not of the invention) similar to Examples 29 and 30 above. Butterfield's buffered phosphate diluent was utilized to minimize any disruption due to osmotic forces to any bacteria already present or added. The results indicate no significant levels of Listeria over the 42 day test period for the uninoculated control while the average plate count for total aerobic bacteria climbed to 3,200,000 cfu per frankfurter by the 42 day assay. Frankfurters from the innoculated control (Example 45) showed rapid growth of Listeria from an initial average plate count of 340 cfu per frankfurter to an average of 1,400,000,000 cfu per frankfurter at 28 days. The bacterial plate count for the 42 day sample was not determined due to excessively high numbers of bacteria as determined by visual examination of the packages which revealed cloudiness of the fluid contained within the evacuated package. This cloudiness is known to those skilled in the art of food microbiology to indicate extremely high levels of bacteria. The excessive bacteria numbers at 42 days were apparent in all the examples except for the uninoculated control (Example 44) and Examples 54 and 55 discussed below. Results of the total aerobic mesophilic plate count show that the growth of total aerobic bacteria which included both Listeria (a facultative anaerobe) and any incidental bacterial increase from an average of 120 cfu per frankfurter to an average of 1,900,000,000 cfu per frankfurter at the 28 day assay.

In Examples 46–53, water based solutions of the disodium salt of EDTA were tested. Na$_2$EDTA in solution was tested on frankfurters alone and in combination with propylene glycol, sodium benzoate, potassium sorbate, lysozyme and as a three component system with propylene glycol and parabens. Propylene glycol was also tested alone and with a commercially available liquid smoke sold under the brand name Charsol®, C-10 by Red Arrow Products Co. of Manitowoc, Wis. All of the frankfurters coated with these test solutions showed unacceptably high bacterial growth at the end of the 42 day test period. However, Examples 46, 49–52 were of some benefit in inhibiting the growth of bacteria as shown by the reduced average total aerobic bacteria counts through the 28 day assay relative to the innoculated control, but only the lysozyme, sodium benzoate, and potassium sorbate containing solutions of Examples 52, 50 and 51, respectively, showed any effect at producing logarithmic reductions in average Listeria plate counts at 28 days.

Examples 54 and 55 tested water based solutions containing 100 ppm and 250 ppm of nisin (the nisin was added in the form of Nisaplin) in combination with 0.8 weight percent of Na$_2$EDTA as an antibacterial coating for pasteurized frankfurters. These coatings were effective against the innoculation of frankfurters with pathogenic Listeria, reducing the initial average plate count to less than 10 cfu per frankfurter and maintaining an average plate count of 20 cfu or less per frankfurter for the entire 42 day test period. Use of Listeria selective LPM agar may reduce, through the selective nature of the agar, the number of Listeria organisms originally present. Therefore, the total aerobic bacteria count was performed using a nonselective standard method agar such as TGY agar. Counts made for total aerobic bacteria include not only Listeria colonies but also any incidental colonies from other bacteria which may grow in competition with or in addition to the Listeria such as Staphlococcus. The average plate counts for total aerobic bacteria for Examples 54 and 55 indicate a surprising logarithmic reduction in organisms relative to the innoculated control of Example 45. Average plate counts were not only 10 or less cfu per frankfurter initially and at 14 days, but the 28 days counts were <10, <10, and 3,900 cfu per frankfurter for Example 54 and <10, 230, and 70,000 cfu per frankfurter for Example 55 compared to 80 million, 440 million and 5.2 billion cfu per frankfurter for the three innoculated control plates (average—1.9 billion cfu). At 42 days the 100 ppm nisin and Na$_2$EDTA solution coated frankfurters had an average plate count of less than 10 cfu per frankfurter, while the three plates assayed for the 250 ppm nisin and Na$_2$EDTA solution coated frankfurters of Examples 55 were counted at <10; 270,000; and 1,300,000 cfu per frankfurter. Thus, the 42 day total aerobic bacteria counts for the innoculated frankfurters of Example 54 and 55 may be favorably compared with the three plate counts of 130,000; 180,000; and 9,200,000 cfu per frankfurter (average—3.2 million cfu) assayed at 42 days for the uninnoculated control of Example 44. These remarkable results further indicate that compositions containing nisin and a chelating agent may be used to protect against growth of pathogenic and food spoilage bacteria over long periods of time at reduced temperatures. Thus, food preservation may be enhanced with longer times of preservation. The novel compositions may be employed as a dip solution or may be sprayed, mixed with the foodstuff or may be coated onto packaging films for subsequent food surface contact.

EXAMPLES 56–65

Examples 56–65 assessed the antimicrobial potential of using coated frankfurter casings for control of Listeria monocytogenes and other naturally occurring microorganisms on frankfurters which have had the casings removed therefrom prior to vacuum packaging.

Frankfurters were made utilizing the beef/pork emulsion recipe and procedure described above for Examples 29–43 except that the dextrose level in the recipe for Examples 56–65 was one half that reported in Table A. Processing was similar, but at 25% relative humidity and the frankfurters were cooked until reaching an internal temperature of about 160° F. (71° C.). A further exception to the above procedure for making frankfurters that was the casing used was internally coated with the test components by addition of nisin and/or the di-or tri-sodium salt of EDTA to a shirring solution prior to shirring of the casing. The test components were added in the amounts sufficient to give the weight percentages listed in Table 4 which are based upon the total weight of the finished shirred remoisturized casing. Examples 56 and 57 were run, respectively, as uninnoculated and innoculated controls (not of the invention) and utilized commercially available casing containing substantially the same shirring solution components as Examples 58–65 except without either nisin or an EDTA sodium salt. Similar low amounts of nisin were used in Examples 64 and 65. The nisin used in Example 64 was a commercially available nisin using the quantitative values reported by the manufacturer. The nisin used in Example 65 was first determined to be 0.0005 wt. % by the supplier and then later recalculated as 0.00035 wt. % based upon a reassay of the nisin preparation used as described above in Examples 36–39. Typical shirring solutions are disclosed e.g. in U.S. Pat. No. 3,898,348 which is hereby incorporated by reference. Following removal of the casings, the frankfurters were refrigerated at about 4° C. until beginning microbiological testing. The freshly made refrigerated frankfurters were innoculated with a mixture of Listeria monocytogenes and assayed initially (Day 0), and at day 7, 14, 28 and 42 following procedures described above for Examples 44–55 except as noted herein. The innoculation of frankfurters with Listeria was made at a level of at least about 1000 organisms per frankfurter. The innoculated frankfurters were stored eight to a package with separate sets of packages for frankfurters of each test casing similar to the procedures for Examples 44–55 and stored at about 40° F. (4.4° C.) until assayed. The arithmatic average of the assay results are reported in Tables 4a and 4b.

TABLE 4a

| Example No. | Test Components | | | | Listeria count (cfu/frankfurter) Time (day) | | | | |
|---|---|---|---|---|---|---|---|---|---|
| | A | Amount of A (wt. %) | B | Amount of B (wt. %) | 0 | 7 | 14 | 28 | 42 |
| 56 | uninnoculated control | — | — | — | <10 | <10 | <10 | <10 | <10 |
| 57 | innoculated control | — | — | — | 8,500 | 7,300 | 120,000 | 6,300,000 | 200,000,000 |
| 58 | — | — | Na$_3$EDTA | 0.8 | 8,500 | 6,800 | 620 | 32,000 | 1,500,000 |
| 59 | nisin | 0.0135 | — | — | 4,700 | 38,000 | 28,000 | 25,000,000** | 740,000 |
| 60 | nisin | 0.0135 | Na$_3$EDTA | 0.8 | 3,300 | 2,300 | 3,600 | 32,000,000 | 300,000,000 |
| 61 | nisin | 0.0060 | Na$_3$EDTA | 0.8 | 11,000 | 3,100 | 3,600 | 66,000 | 20,000,000+ |
| 62 | nisin | 0.0060 | Na$_2$EDTA | 0.8 | 5,000 | 8,300 | 37,000 | 22,000++ | 4,900,000 |

TABLE 4a-continued

| Example No. | Test Components A | Amount of A (wt. %) | B | Amount of B (wt. %) | Listeria count (cfu/frankfurter) Time (day) | | | | |
|---|---|---|---|---|---|---|---|---|---|
| | | | | | 0 | 7 | 14 | 28 | 42 |
| 63 | nisin | 0.0026 | Na$_3$EDTA | 0.8 | 6,100 | 3,100 | 4,700$^a$ | $^{aa}$ | 8,500,000 |
| 64 | nisin | 0.0005 | Na$_3$EDTA | 0.8 | 5,900 | 29,000 | 120,000 | 51,000,000 | 300,000,000 |
| 65 | nisin* | 0.00035 | Na$_3$EDTA | 0.8 | 5,500 | 5,500 | 310,000$^b$ | 23,000 | 21,000$^{bb}$ |

*The nisin in Examples 59–64 was Nisaplin brand nisin preparation; Example 65 used a nisin preparation made by culturing streptococcus lactis in skim milk which was the same noncommercial nisin preparation described above in Examples 36–39.
**Average of two plates; third plate count was 34,000 cfu.
$^+$Average of two plates; the third plate count was 44 billion cfu.
$^{++}$Average of two plates; the third plate count was >1,000,000 cfu.
$^a$Average of two plates; the third plate count was 2,400,000 cfu.
$^{aa}$The three plate count were 130,000; >10,000,000; and 350,000,000 cfu.
$^b$Average of two plates; the third plate count was 470 cfu.
$^{bb}$Average of two plates; the third plate count was 3,300,000 cfu.

TABLE 4b

| Example No. | Test Solution Components A | Amount of A (wt. %) | B | Amount of B (wt. %) | Total Aerobic Bacteria Count (cfu/frankfurter) Time (day) | | | | |
|---|---|---|---|---|---|---|---|---|---|
| | | | | | 0 | 7 | 14 | 28 | 42 |
| 56 | uninoculated control | — | — | — | 900 | 2,000 | 360 | 4,300,000 | 22,000 |
| 57 | innoculated control | — | — | — | 6,700 | 6,100 | 210,000 | 3,600,000 | 680,000,000 |
| 58 | — | — | Na$_3$EDTA | 0.8 | 5,000 | 2,100 | 1,700 | 14,000,000 | 210,000,000 |
| 59 | nisin | 0.0135 | — | — | 4,500 | 3,300 | 22,000 | ** | 710,000 |
| 60 | nisin | 0.0135 | Na$_3$EDTA | 0.8 | 3,300 | 1,600 | 1,300 | 2,800,000 | 190,000,000 |
| 61 | nisin | 0.0060 | Na$_3$EDTA | 0.8 | 5,600 | 1,800 | 1,700 | 18,000 | 14,000,000+ |
| 62 | nisin | 0.0060 | Na$_2$EDTA | 0.8 | 3,900 | 3,100 | 8,500 | 12,000$^{++}$ | 7,000,000,000 |
| 63 | nisin | 0.0026 | Na$_3$EDTA | 0.8 | 4,500 | 3,800 | 4,500$^a$ | 210,000,000 | 130,000,000 |
| 64 | nisin | 0.0005 | Na$_3$EDTA | 0.8 | 4,600 | 24,000 | 42,000 | 8,200,000 | 210,000,000 |
| 65 | nisin* | 0.00035 | Na$_3$EDTA | 0.8 | 4,000$^b$ | 2,000 | 120,000 | 7,100 | 1,200,000,000 |

*The nisin in Examples 59–64 uns Nisaplin brarid nisin preparation; Example 65 used a nisin preparation made by culturing streptococcus laclis in skim milk which was the same noncommercial nisin preparation described above in Examples 36–39.
**The three plate counts were 9,700; 2,100,000; and >1,000,000 cfu.
$^+$Average of two plates; the third plate count was 18 billion cfu.
$^{++}$Average of two plates; the third plate count was >1,000,000 cfu.
$^a$Average of two plates; the third plate count was 400,000 cfu.
$^b$Average of two plates; there was a laboratory error analyzing the third plate.

Referring to Tables 4a and 4b, the uninnoculated, untreated frankfurters of control Example 56 showed no evidence of Listeria throughout the 42 day test and the average total aerobic plate counts grew from 900 cfu per frankfurter initially to 4,300,000 cfu per frankfurter at day 28, and 22,000 cfu per frankfurter at day 42.

The innoculated control exhibited an initial average level of Listeria of 8,500 cfu per frankfurter which grew to 200,000,000 cfu per frankfurter by day 42 and had an initial average total aerobic bacteria plate count of 6,700 cfu per frankfurter which grew to 680 million cfu per frankfurter by day 42. Both controls were made using unmodified commercially available E-Z Peel Nojax® cellulosic nonfibrous casing manufactured by Viskase Corporation of Chicago, Ill. Examination of the data for Examples 58–65 indicate that antimicrobial agents applied to casing prior to stuffing with meat emulsion and cooking were transferred to cooked frankfurter surfaces in amounts sufficient to inhibit growth of both Listeria and total aerobic bacteria relative to the innoculated control (Example 57) following removal of the casing from the frankfurter.

Regular cellulosic casings may also be used in the present invention. Such casings may forego chemical peeling aids. Advantageously, such casings may be acid treated, or encased foodstuffs, particularly protein and fat containing foodstuffs such as freshly stuffed sausages, may be showered with an acidic solution prior to heat treatment (cooking or pasteurization). Such acid treatment may have a beneficial effect which enhances or maintains the ability of antimicrobial agents such as nisin or pediocin either alone or in conjunction with a chelating agent, to protect the encased foodstuff before and after heat treatment and/or casing removal.

EXAMPLES I–IV

Examples I and II are comparative examples not of the invention. Examples III and IV are of the present invention.

In all of the following examples the food packaging film referred to comprises a nonfibrous, small diameter, regenerated cellulose casing of the type well known in the art for the manufacture of skinless frankfurters, wieners and the like. Such casing may be coated or impregnated with various additives to enhance shelf-life, peelability, etc.

Dry stock, nonfibrous casing is conventionally shirred into sticks of casing for use on a conventional stuffing machine. During the shirring operation, just prior to the gathering of the casing into pleats, a sprayed solution is uniformly applied at a constant rate to the internal surface of the casing. This is a conventional method (See e.g. U.S. Pat. No. 3,462,794 which is hereby incorporated by reference) of applying an internal coating to a casing.

Four different solutions as described in Table I may be applied by the above procedure to provide four different casing samples with each sample having an equivalent controlled amount of solution applied uniformly thereto.

The solution composition of comparative Example I is a typical solution sprayed on the interior of a casing just prior to shirring. The water moisturizes the casing and also acts as a carrier for the other components which may include a plasticizer and/or humectant such as propylene glycol, a lubricant such as mineral oil, an emulsifier such as a mixture of ethoxylated monodiglycerides sold under the brand name Mazol 80 by Mazer Chemicals, Inc. of Gurnee, Ill., and a peeling aid such as carboxymethylcellulose.

The solution of comparative Example II is of the same composition as Example I except that a chelating agent viz the disodium salt of ethylenediaminetetraacetic acid ($Na_2EDTA.2H_2O$) is added.

The solution of Example III of the invention is similar to that of comparative Example II except that 0.025 weight percent of the solution comprises an antimicrobial agent in the form of lysozyme.

The solution of Example IV of the invention is similar to that of comparative Example II except that 1.0 weight percent of Nisaplin is added. Nisaplin is a trademarked commercial nisin preparation made from a pure culture fermentation of nonpathogenic strains of Streptococcus lactis belonging to Lancefield Group N with penicillin- free, heat-treated sterilized nonfat milk digest. The fermentation product is concentrated by a foaming process and extracted by salt precipitation under acid conditions and dried by a spray process to produce a mixture which has an activity which is 1/40th of pure nisin. Nisin preparation is further described in the Federal Register Vol. 53, No. 66, pp. 11247–11251 (Apr. 6, 1988) which is hereby incorporated by reference. Since 1.0 weight percent of Nisaplin is used, the solution of Example IV contains 0.025 weight percent of nisin. The activity of pure nisin is about $40 \times 10^6$ IU per gram.

Each of the above four solutions are uniformly applied to similar but separate samples of casings. Each solution is sprayed at a constant rate which is adjusted for each solution to provide a sprayed casing that has a water moisture content of about 19.3 percent by weight based on the total weight of the moisture coated casing.

The four samples of shirred casing, each internally coated with a different solution, may be conventionally stuffed with a typical all beef frankfurter meat emulsion on a commercially available machine such as a Frank-A-Matic brand frankfurter stuffing machine manufactured by Townsend Engineering Co. of Des Moines, Ia. to a stuffed diameter of about 21–22 millimeters. The encased wieners may then be collected on racks and placed in a smokehouse for conventional heat treatment.

A typical heat treatment process includes admitting humidified hot air from a gas fired heater until the smokehouse temperature is increased (usually taking 15–30 minutes) to a dry bulb temperature of about 140° F. (60° C.) and a relative humidity (RH) of about 25%. Smokehouse dampers are then closed; smoke is admitted and the temperature and humidity held constant at 60° C./25%RH for fifteen minutes. Then admittance of smoke is halted, the smokehouse dampers are allowed to open as needed and the smokehouse temperature is raised (over a time period of usually 15–20 minutes) to a dry bulb temperature of about 160° F. (71° C.) at a constant relative humidity of about 25% and held there for fifteen minutes. Then the dry bulb temperature is again raised (usually taking 15–20 minutes) to about 180° F. (82° C.) at a constant 25% relative humidity and held there for about 45 minutes until the internal temperature of the encased frankfurters reaches 155°–160° F. (68°–71° C.).

After reaching an internal temperature of 155°–160° F. (68°–71° C.), the heat is turned off and cold tap water is showered over the frankfurters for about ten minutes whereupon the frankfurters are moved to a brine shower tunnel where the encased frankfurters are showered in a brine (8% salt) water solution at about 25° F. (–4° C.) for approximately ten minutes until the internal temperature of the frankfurter is cooled to about 35° F. (2° C.).

The casing may then be removed from the chilled encased frankfurters by conventional equipment such as an Ranger Apollo peeler to produce "skinless" wieners.

Skinless frankfurters of each example may now be innoculated with a buffered solution containing three strains of pathogenic Listeria monocytogenes. Listeria may be applied to each frankfurter surface using a sterile swab, which is dipped into the Listeria containing solution and swabbed once across the frankfurter length so that at least approximately 100 and preferably at least 1000 cells of Listeria monocytogenes are deposited on the surface of each frankfurter.

The innoculated wieners may then be packaged in two layers with each layer having four wieners so that eight wieners are in a multilayer thermoplastic barrier bag having a core oxygen and moisture barrier layer comprising a mixture of vinylidene chloride-methyl acrylate copolymer and vinylidene chloride-vinyl chloride copolymer and outer layers of ethylene-vinyl acetate copolymer on either side of the core. For each example, a plurality of bags each containing eight wieners is evacuated to 29 inches of mercury and heat sealed.

The packaged innoculated wieners may then be refrigerated at about 40° F. (4° C.) with samples from packages of each example being tested initially and every two weeks thereafter for six weeks.

At the above intervals, sample frankfurters may be tested by removing a wiener and washing off any microorganisms thereon with a sterile buffer. The wash buffer is then tested for (1) a standard plate count with tryptone glucose yeast agar by conventional means and (2) a selective Listeria monocytogenes count using LPM agar and the FSIS method described above for Examples 1–28.

The initial sampling of frankfurter is expected to confirm the presence of Listeria on all samples and of lysozyme and nisin on the frankfurters from Examples III and IV respectively.

After both four and six weeks the above comparative Examples I and II are expected to both show growth of live colonies of Listeria monocytogenes relative to the initial innoculation. The lysozyme treated frankfurters of Example III are expected to show fewer viable Listeria organisms compared with the innoculated control samples. The nisin treated frankfurters of Example IV are also expected to show a decrease in viable Listeria organisms relative to the innoculated control wieners at four and six weeks.

The above comparative Examples I and II and Examples III and IV of the present inventions demonstrate the method and film of the present invention.

Further modifications of the invention disclosed will be apparent to those skilled in the art and all such modifications are deemed to be within the scope of the invention as defined by the following claims.

What is claimed is:

1. A bactericidal food preservation preparation composition comprising a mixture adapted for coating a food product for preservation thereof, said mixture having a Pediococcus-derived bacteriocin or synthetic equivalent antibacterial agent in combination with a chelating agent in an amount effective to kill pathogenic Listeria monocytogenes upon contact wherein said composition is a solid-in-liquid suspension or a liquid mixture having a pH$\leq$6 and wherein said chelating agent is present in an amount of at least 0.8 weight of said mixture.

2. A composition, as defined in claim 1, wherein said antibacterial agent comprises pediocin.

3. A composition, as defined in claim 1, wherein said chelating agent is organic.

4. A composition, as defined in claim 1, wherein said chelating agent comprises an aminopolycarboxylic acid or its salt.

5. A composition, as defined in claim 1, wherein said chelating agent comprises a hydrocarboxylic acid or its salt.

6. A composition, as defined in claim 1, wherein said chelating agent comprises EDTA or its salts, citric acid or its salts, or cyclodextrin.

7. A composition, as defined in claim 1, wherein said composition has a pH$\leq$5.

8. A composition, as defined in claim 1 wherein said chelating agent comprises a salt of EDTA.

9. A composition, as defined in claim 1, wherein said antibacterial agent is present in an amount of at least 5 ppm.

10. A food preservation preparation comprising a composition adapted for addition to a sausage food product for preservation thereof and in an amount effective to kill pathogenic Listeria monocycogenes upon contact, said composition comprising pediocin and a chelating agent which is present in an amount of at least 0.8 weight percent of said mixture.

11. A preparation, as defined in claim 10, wherein said composition is a solid-in-liquid suspension or a liquid mixture.

12. A preparation, as defined in claim 10, wherein said composition has a pH$\leq$6.

13. A preparation, as defined in claim 10, wherein said composition has a pH$\leq$5.

14. A preparation, as defined in claim 10 wherein said pediocin is present in an amount of at least 5 ppm.

15. A preparation, as defined in claim 10, wherein said composition further comprises shellac or zein.

16. A bactericidal composition comprising a Pediococcus-derived bacteriocin or synthetic equivalent antibacterial agent in combination with a chelating agent.

* * * * *